United States Patent [19]
Vaught

[11] Patent Number: 5,228,230
[45] Date of Patent: Jul. 20, 1993

[54] FISHING LURE WITH SIMULACRUM

[76] Inventor: Gerald D. Vaught, 411 N. Commerce, Crane, Mo. 65633

[21] Appl. No.: 859,839

[22] Filed: Mar. 30, 1992

[51] Int. Cl.⁵ .................................... A01K 85/00
[52] U.S. Cl. ..................... 43/42.26; 43/42.28; 43/42.39; 43/42.41
[58] Field of Search ............ 43/42.13, 42.26, 42.24, 43/42.28, 42.29, 42.32, 42.33, 42.38, 42.39, 17.6, 42.41

[56] References Cited

U.S. PATENT DOCUMENTS

| | | | |
|---|---|---|---|
| 1,267,627 | 5/1918 | Campbell | 43/42.26 |
| 1,921,176 | 8/1933 | Unkefer | 43/42.33 |
| 1,976,695 | 10/1934 | Boehm | 43/42.26 |
| 2,492,064 | 12/1949 | Rauh | 43/42.28 |
| 2,616,559 | 11/1952 | Hyland | 43/42.53 |
| 2,741,058 | 4/1956 | Allman | 43/42.39 |
| 2,770,063 | 11/1956 | Martin | 43/42.39 |
| 3,377,734 | 4/1968 | Snow | 43/42.24 |
| 4,429,487 | 2/1984 | Honse | 43/42.32 |
| 4,771,567 | 9/1988 | Cannon | 43/42.39 |
| 4,945,669 | 8/1990 | Webel | 43/42.39 |

Primary Examiner—Richard K. Seidel
Assistant Examiner—Jeanne M. Elpel
Attorney, Agent, or Firm—Thomas M. Scofield

[57] ABSTRACT

An improved fishing lure accessory for use, unmodified, with may types of fishing lure base structure to aid in catching fish; the new said accessory associated with a multiplicity of types and structures of lures consisting of a cloth or cloth analogue of a crayfish or other aquatic animal or insect representation; application of a cloth or cloth analogue representation of a crayfish or other organism, aquatic or not, to the materials and specific constructions of various types of fishing lures in certain manners; cloth or cloth analogue representations of a crayfish or other organisms which are secured to the lure structural elements, yet have moving, tailing or outwardly extending elements of the body of the organism present, whereby to give unusual and life-like action to the "bait" in the use of the lure in fishing.

15 Claims, 3 Drawing Sheets

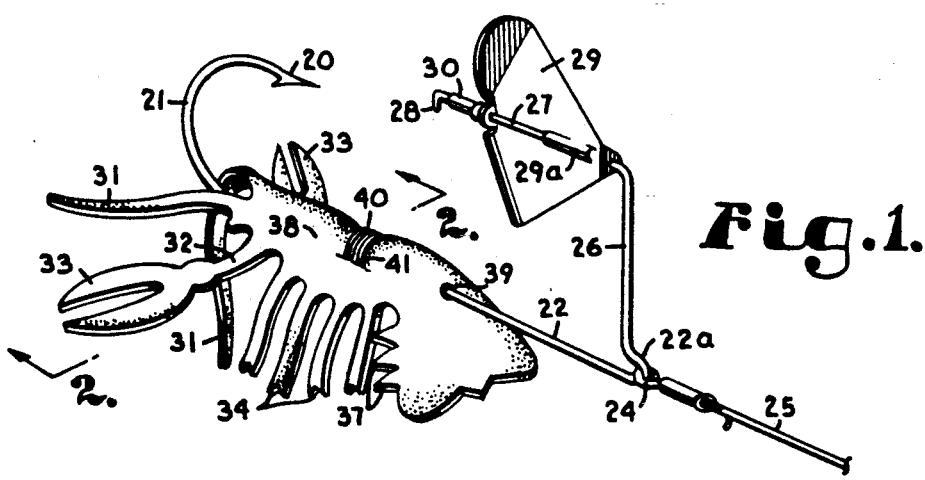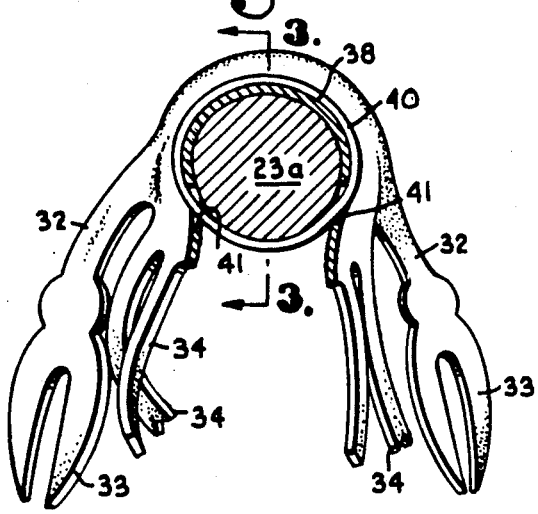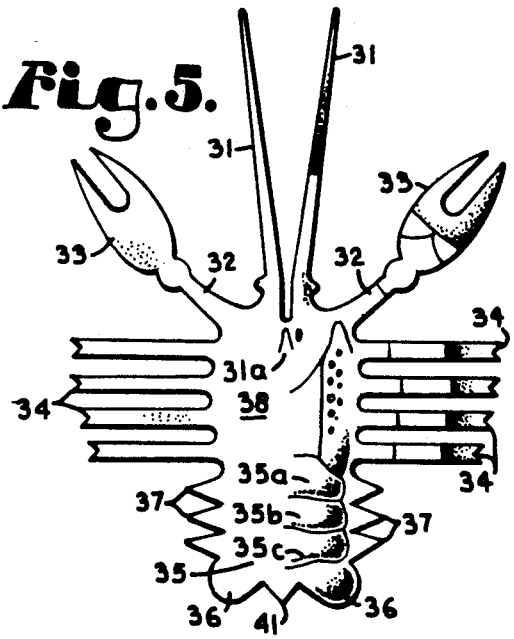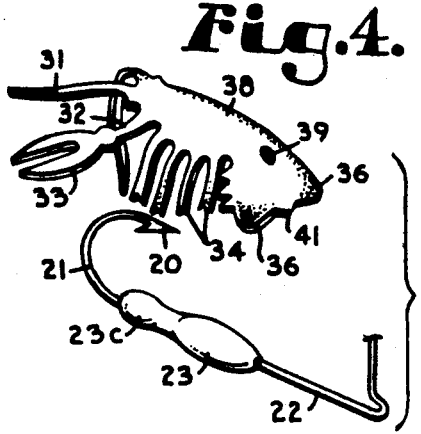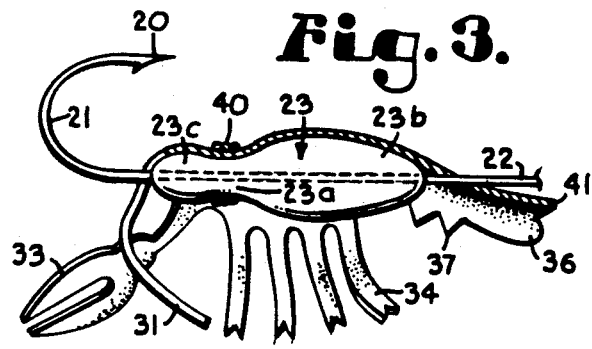

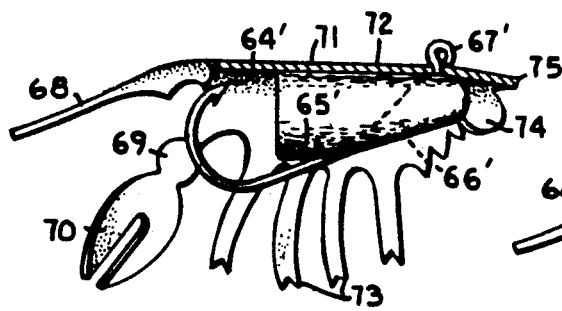
Fig. 11.
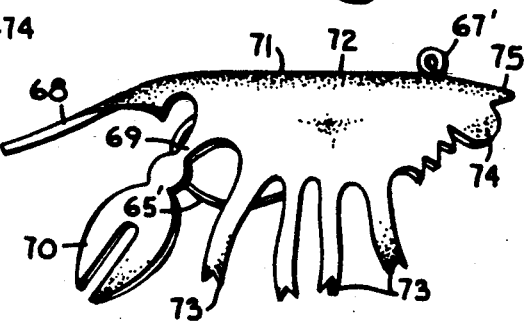
Fig. 12.
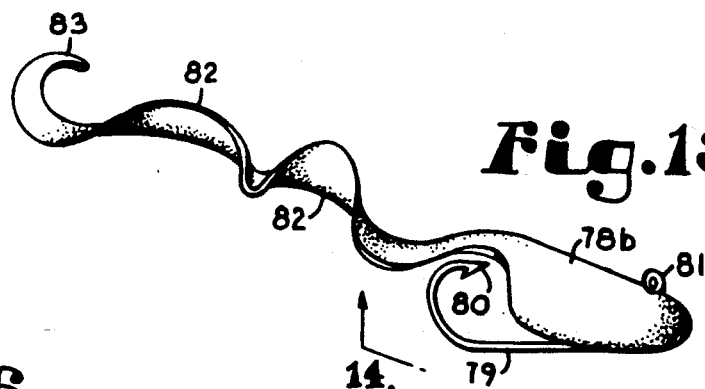
Fig. 13.
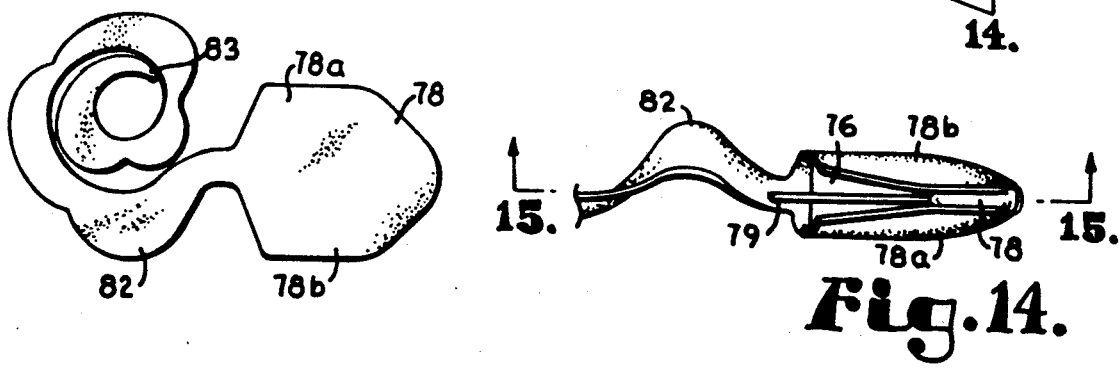
Fig. 16.
Fig. 14.
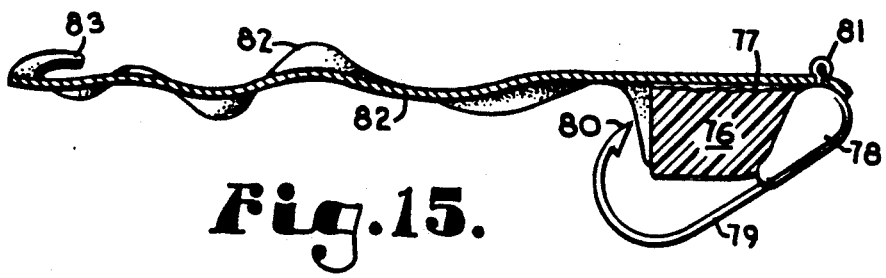
Fig. 15.

FISHING LURE WITH SIMULACRUM

BACKGROUND OF THE INVENTION

Fishing lures of the most varied sort, type and structure are known to the prior art. For example, the 1987 catalog of the Bass Pro Shops of Springfield, Mo. includes fifty pages (of the four hundred twenty five page catalog) of lure ads, each page tightly packed with illustrations and descriptions of various types of lures, the said fifty pages devoted solely to fishing lures. Also, in such advertising lures, the most varied use of attachments or add-on constructions are employed with various lure structures, shapes and bodies to provide fish attractive motion and members around the the lure core to the fish, such also sometimes aiding in screening the hook or hooks. Three dimensional solid, though typically resilient, stylized or realistic representations of worms, frogs, crawdads, small fish, squid, minnows and various small fish: shad, stripers, fingerling bass, bream, shiners, etc., may be found attached to various parts of some of the lures and lure elements in the noted catalog.

Many lures with various additive parts and/or having attachments or simulations employed therewith are more or less effective at one or another time, in one or another location, dependent upon a whole gaggle of factors, many of which may not be known at a given place or time, fish type or location, or perhaps even never knowable. The simple fact is that fishing has become a great "industry" and, within this industry and the activity which gives rise to it, a very large number of fishing lures have been and are being developed, manufactured, sold and used. Such may or may remain on the market with others with new and perhaps useful or more useful characteristics also constantly coming on the market. The patent efforts in this field are believed continuous and heavy.

This invention relates in general to improvements in fish attracting accessories secured to fishing lures and, more particularly, to new and improved combinations of known hooks, sinkers, weed separators or deflectors, spinners, propellers, bait protectors and the like combined with the new fish attracting forms, attachments, shapes and accessories employed therewith. The particular lures illustrated and described in this specification and the drawings thereof are well known in and especially successful in fresh water fishing. We do not wish to be limited to a lure for fresh water fishing alone because the new and novel details of my fishing lure attachment may be applied to brackish and salt water, as well as fresh water, fishing.

OBJECTS OF THE INVENTION

An object of the invention is to provide a number of types of fishing lure-accessory combinations which will all be so shaped, in the various parts thereof, so as to produce a rhythmic weaving or motion of the body of the lure in its path through the water thereby simulating either a crawdad or a bait fish.

Another object of the invention is to provide a new type of fishing lure accessory which has an entirely different appearance in action and use than lures that have gone before.

Another object of the invention is to provide a fishing lure which is extremely simple and practical in construction, strong and reliable in use, small and relatively compact in structure, all the inexpensive to manufacture and otherwise well adapted for the purposes for which the same is intended.

Still another object of the invention is to provide a skin-like overlay, sometimes of the entire lure carrying the overly which resembles a crayfish, crawfish or crawdad and is oriented in the head backwards fleeing position of such an organism and/or the defensive or attack position of same.

Still another object of the invention is to provide a skin-like appendage or attachment for a fishing lure where said appendage may be secured to a weight portion of the lure with the hook extending rearward thereof and not covered by the appendage or cover.

Yet another object of the invention is to provide a skin-like shaped and configured piece of cloth or other material, with or without external markings, which is employable and usable with quite different types of fishing lures, including those with weed guards, the skin or appendage of the marine animal either exposing or hiding, to greater or lesser degree, as the manufacturer/inventor decides the optimum hook portion of the lure and, very generally, any weed guard portion of the lure and any weight portion of the lure.

Another object of the invention is to provide a novel weed guard construction that involves the securement of a plastic body on to part of the lure, this water permiable plastic body also offering an underlying support for the skin portion of the lure, whereby the body portion will look more realistic as being filled out.

Other and further objects of the invention will appear in the course of the following description thereof.

THE DRAWINGS

In the drawings, which form a part of the Instant Specification and are to be read in conjunction therewith, embodiments of the invention are shown and, in the various views, like numerals are employed to indicate like parts.

FIG. 1 is a three-quarter perspective view from above, of a first type of lure, looking toward the sharp end of the hook; the crawdad "skin" being mounted over the weights of the lure assembly, facing rearwardly.

FIG. 2 is a view taken along line 2—2 of FIG. 1 in the direction of the arrows.

FIG. 3 is a view taken along the line 3—3 of FIG. 2 in the direction of the arrows, but also showing the entire length of the weight, hook and "skin".

FIG. 4 is an exploded view of the lure of the previous figures with the crawdad "skin" shown positioned above the basic hook/weight construction of the earlier figures.

FIG. 5 is a plan view from directly above, of the crawdad "skin" laid out flat on a flat horizontal surface, with the upper side thereof towards the viewer.

Figure 6:
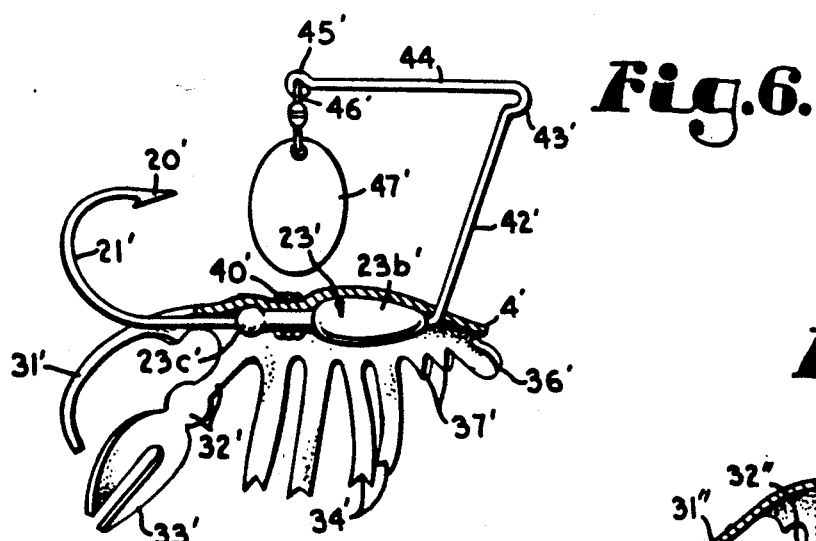

FIG. 6 is a three quarter perspective view from above of a spinner, not propellor carrying, lure analogous to that of FIGS. 1-4, inclusive but wherein the leading portion of the wire carrying the weight and the hook is sharply bent upwards after the weight, extending through the body or rear end of the crawdad mimicking skin. The connection 23 for a line 25, as seen in the lower right corner of FIG. 1 is central of the level on the weight and "skin" and below the hook as seen in the view. This is not the case in FIG. 6.

Figure 7:
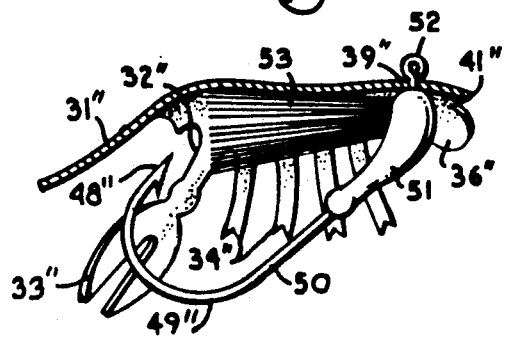

FIG. 7 is yet a different form of the subject lure wherein a weed guard is attached to the weight in front of and above the hook with the weed guard also supporting the central body of the crawdad skin to give it a filled out look and also protecting the hook.

Figure 8:
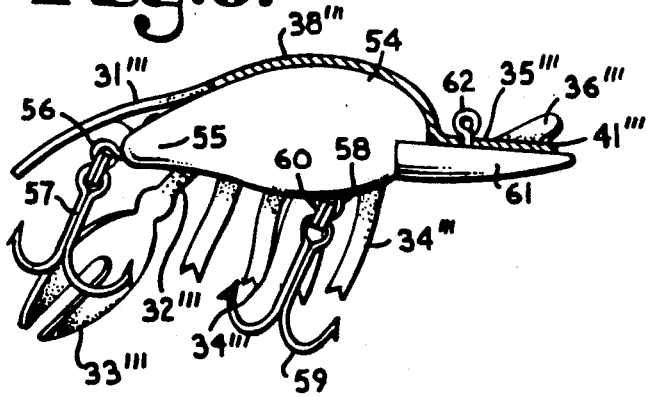

FIG. 8 is a side view of the subject crayfish/crawdad skin lure, mounted over the top of a conventional floating type casting lure.

Figure 9:
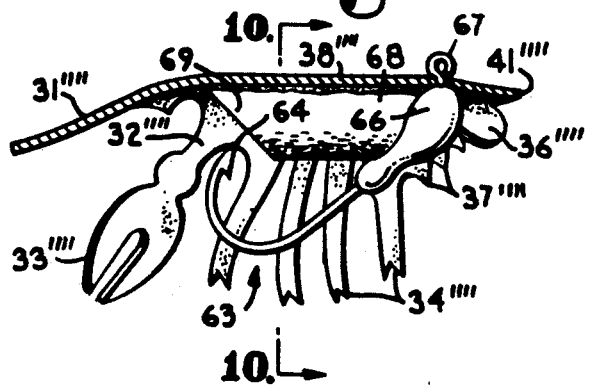

FIG. 9 is a side view of the subject crayfish "skin" with, in the view, the crayfish "skin" cutaway down the middle thereof whereby to show the structure of the hook and wire, including attachment loop and barb, the weight and, additionally, an absorbent, foam plastic body which underlies a good portion of the length of the crayfish skin body portion, filling it out, the plastic body (foam body), with the crayfish skin also acting like or as a weed guard.

Figure 10:
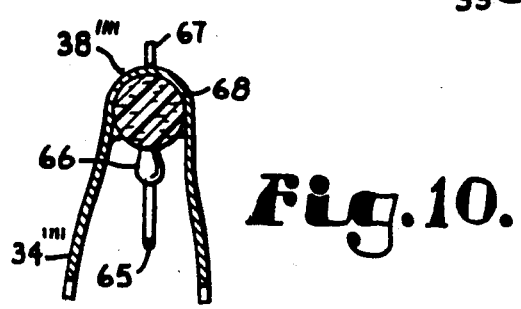

FIG. 10 is a view taken along the line 10—10 of FIG. in the direction of the arrows.

FIG. 11 is a view of another modification of the subject invention with the central structure of hookwire, weight and absorbent foam plastic, the same as the structure in FIG. 12.

FIG. 12 is the device of FIG. 11 with the drape of the crawfish "skin" nearest the observer, cut back, so that the hook, weight, line eyelet and plastic body are fully seen with the "skin", "skin" body filled billed by the body and the plastic body and skin here effectively acting as a weed guard.

FIGS. 13-16, inclusive, show another form of the subject device utilizing an "animal" shape differing from the crawdad.

FIG. 13 is a side view, of the device with the snake or "animal" fully extended as it would be when the fisherman's line would be pulling it through the water back toward the fisherman.

FIG. 14 is a view taken along line 14—14 of FIG. 13 in the direction of the arrows comprising an underside view of the device of FIG. 13 showing the underside limits of the "head" of the "skin" with the weight and the hook, as well as the plastic body being visible with only a portion of the tail being present.

FIG. 15 is a view taken along the line 15—15 of FIG. 14 in the direction of the arrows.

FIG. 16 is a view of the device from the top with the head portion not yet wrapped around the weight and plastic body portion or hook and the tail coiled.

STRUCTURE AND FUNCTION

Referring first to FIGS. 1-4, and 5 first, at 20 is seen the barb of a hook which, following the conventional curvature of the hook at 21 extends in a substantially straight line portion thereof numbered 22, here a rather considerable distance from the hook portion itself. A weight 23 which may be two parts or two different size sections is rigidly fixed to rod portion 22 of the hook assembly. At the end of portion 22 of the hook assembly, there is a half loop portion 22a to which may be attached the engaging loop 24 of fishing line 25.

From half loop 22a, a substantially normally vertical wire portion 26 rises in the plane of the hook, preferably, to a terminal right angled portion 27. Which has bent over portion 28 to retain "propeller" means 29 on shaft 27. A rotatable fitting 30 may be supplied to space the propeller 29 away from the end 28. Line 27 passes through sleeve 29a to mount rotator 29.

Looking particularly at FIG. 5, there is shown a top plan view of the crayfish "skin" which pattern is actually an abstraction or simulacrum of the certain living and working structures of this organism, which in its natural environment is known to be attractive to certain fish, these fish also being among those desirably sought by a fisherman. Beginning at the top of FIG. 5, feelers or sensors 31 extend forwardly outwardly from the "head" 31a of the animal. Arms 32 have claws or pincers 33. Legs 34 are shown extending outwardly from the thorax of the "animal's" body. The segmented tail 35 has segments 35a, 35b, and 35c as well as tail portions 36. The body segments are spiked at the sides as seen at 37.

With the exception of the fully extended legs in the horizontal dimension, the pattern made (when the "skin" of FIG. 5 is mounted three-dimensionally on a lure) is that of a crayfish in a defensive or fighting position, say, defending itself from a fish.

In the FIGS. 1-4, inclusive, it is seen how the crayfish "skin" may be arranged and carried with respect to the lure parts of a specific lure structure. In FIG. 4, the rear portion of the back 38 of the crawdad is provided with opening 39 for mounting on the lure. Before the upper configuration 23, 26, 27 and 28 is formed, preferably while the wire with the hook on one end is straight, the "skin" is slid onto the wire and moved rearwardly towards the hook 21 until the "skin" overlies the portions of the weight 23 (FIG. 3). Wire 40 is wound around the neck 23a between the larger portion 23b of the weight and the smaller portion 23c thereof. As may be seen in FIG. 1, wire 40 is passed around the neck 23a through slits 41 provided in the forward (but rearwardly facing) portion 38 of the "skin". FIGS. 1 and 3 show pretty well how the crawdad "skin" drapes three-dimensionally so as to simulate the three-dimensional appearance of the actual three-dimensional organism when the hook assembly is lifted off the ground with the rod 22 essentially horizontal. The same is true of FIG. 2, although it doesn't show that much detail of the "skin". Thus, until the fisherman starts retrieving the bait, the feelers, legs and claws/arms, at least, droop vertically. With retrieval these parts move and flutter in lifelike manner, so that the simulated free body parts, including the simulated feelers, legs and claws of the simulacrum, move as the fisherman retrieves the lure, and move in a manner which simulates the normally free body parts of the actual organism, these of course being the feelers, legs and claws thereof. It should be noted that FIG. 3 clearly shows how the weight 23 is conformed to provide the central body portion or back 38 of the crayfish simulacrum with a three-dimensional appearance simulating the living crayfish.

FIG. 6 shows the "skin" of FIG. 5 draped on a slightly different spinner carrying assembly. All the parts of this showing are numbered the same, but primed ('), except for the rear portion of the rod or wire constituting the hook and carrying the spinner. Accordingly, these parts will not be redescribed except for the different structure in the spinner. The center end point of the back portion of the crawdad between end flaps 36' is numbered 41'.

Here in this view, the upstanding portion of the wire leading weight 23' at 42' angles sharply upward but not at right angles with respect to weight 23 and portion 23b. Recessed and rounded wire portion 43 operates to receive a connector as at 24 and 23 in FIG. 1 is provided at 43. The arm of the forward portion of the wire member angles rearwardly at 44 with loop 45 therein being engaged by a connector 46 carrying rotatable spoon 47.

In FIG. 7, wherein a weed guard 53 is employed, the hook 48" has curved portion 49" therebefore and essentially straight portion 50 with weight 51 next to the loop 52 for attaching a line. In conventional manner, weed guard 53 is preferably rather full or thick. The parts of the "skin" are numbered the same as in the earlier figures, but double primed ("). In this instance, the skin is supported primarily by the length, diameter and circumference of the weed guard and secondly, by the top of the weight 51.

FIG. 8 shows how the subject skin may be applied to and used with a floating lure. In this embodiment, the floatable body 54 necks down to a lesser diameter portion 55 at the rear thereof, this portion having at its front end loop 56 to receive gang hook 57 thereon. Rearward on the body portion 54, loop 58 engages second gang hook 59 through ring connector 60.

The elements of the body seen in FIG. 8 or "skin"/body of the crawdad is numbered the same as in the previous views, but triple primed ("'). In this particular case, the lure has a projection or dished portion 61 extending from the front portion thereof with loop 62 available for the tail portion 35 to be laid on or engaged by. Wire carrying loop 62 penetrates tail portion 35"'. Aside from the pinning of the tail at 62, both the tail and the body (central body portion, not the legs, feelers or claws) are preferably glued to the float 54 and shelf 61.

Looking at FIG. 9, therein is shown, as in FIG. 10, another version of the subject invention, but with a new additional feature. Parts of the crayfish "skin" which are identical to those of previous drawings are numbered the same, but quadruple primed (""'). They will not be redescribed here.

The lure in this case has but three parts. There is a hook generally designated 63 having a barb 64 and a wire body 65 which passes through weight 66 which is rigidly fixed thereon, ending up with engaging loop 67, which engagement is like that in the lower right hand corner of FIG. 1, with a fishing line. Having a barbed hook with a weight on the straight or straighter wire portion thereof spaced away from the hook is not new. However, there is additionally provided a semi-cylindrical body of porous, water absorbent, plastic foam 68 which preferably has rear beveled away portion 69 to give clearance for the hook barb. The body portion, preferably from just behind the head through the segmented portion 35 is most preferably glued by a somewhat flexible-set plastic glue acting between the underside of the "skin" and the cylindrical body 68, whereby substantially the entire body portion except for the feelers (sensors), arms and claws, legs and pointed segmental sections 37 are fixed to the said plastic body. It will be noted that the elongate plastic foam body extends angularly away from the weight 66 and toward the hook barb 64 so as to support the crayfish simulacrum immediately above the hook barb 64 and thereby ensure that a striking fish will instantly encounter and be secured by the hook 64.

The rear portion of the crayfish "skin" overlies, as preferably does some foam plastic, not seen, the top portion of weight 66. This gives a remarkably three-dimensional look to the bait or lure with only those parts of the crawdad being in motion that would be in motion. It also should be understood as has been described with respect to all of the lures shown in FIGS. 1–4, inclusive, 6, 7, 8 and 9 that the "skin" is mounted so that the head portion of the organism is to the rear, next to or over the hook. The body of the "skin" simulating an animal or organism appears, then, to a fish, particularly a pursuing fish, to be retreating in defensive position or array.

Looking now at FIG. 11 and FIG. 12, this is a showing somewhat resembles the construction of FIG. 9. That is, there is a weight 66', a hook wire 65', a hook wire 64' and line receiving loop 67'. FIG. 11 is a side view, with the crawdad "skin" in place on the lure and visible on the side of the viewer. Feelers or sensors 68, arm 69 and claw 70, back portion 71, segmented portion 72, legs 73 and rear end portions 74 and 75 correspond to the like parts, differently numbered, in FIGS. 1, 4 and 5. It can be seen how well the "skin" hides the weight, foam body and hook from the side and partially from the rear. The rounded nature of the foam body, water permeable, is analogous to the shaping effect of the lure body 54 in FIG. 8. However, lure body 54, 55 is a floating lure while all of the permeable foam lures are underwater lures.

It thus can be seen that the foam bodies of FIGS. 9–12, inclusive show improved lure construction utilizing semicylindrical water permeable plastic foam bodies which serve not only as shapers for the body of the imitated life form, but also serve as weed guards to the barb of the hook. FIG. 9 contrasts sharply with FIG. 12 in that the weight 66 is not received to any extent or substantial extent within the foam body 68 and the hook 64 is a considerable distance below the "skin" of the crawdad. However, FIG. 12 differs in that substantially all of the weight 66' is received within the foam body and hook 64' is positioned just under the "skin" of the crawdad and near the top of the plastic foam.

Referring to FIGS. 13–15 inclusive, therein is shown the use of the plastic foam body as (1) a body three-dimensional filler and (2) a weed guard for the hook with an entirely different "organism" "skin". This lure is not of an actual animal and is not configured to particularly resemble any actual aquatic organism. It has some features of a small snake, a minnow, a grub, a worm and the like. However, it is not any one of these.

What is found here, particularly looking at FIGS. 14 and 15 are seen a substantially cylindrical body 76 of water permeable foam plastic fixed by glue 77 to the underside of the head portion 78 of the subject lure. At the very front of the lure is the somewhat pear-shaped weight 78 through which passes wire 79 having hook 80 at one end thereof and line receiving loop 81 at the other end thereof. Body 82 will coil upon itself as seen in FIG. 16 before it is put into use and, additionally, entirely fabricated into the construction seen in FIGS. 13, 14 and 15. The body has tail end 83. Head end 78 has side portions 78a and 78b which are glued to the outer surface of the plastic body 76 to a greater or lesser extent.

The lure of FIGS. 13–16, inclusive differs from the previously described lures employing the essentially two dimensional crayfish, crawdad "skin". That is, the "animal" seen in FIG. 13 as it is being retrieved by the fisherman after casting has its head end leading and its tail end following. To the contrary, with two dimensional crayfish "skins", the rear end of the animal moves toward the fisherman with simulated parts of the animal moving or gesturing in a self defense posture to the rear.

The "filler" for the simulacrum "skin" may be merely a weight on a hook stem as in FIGS. 1–4, inclusive and 6. Alternatively, a weed guard may underlie the body portion of the simulated "skin", with the length and fullness of the weed guard determining the look of the skin thereover. In FIG. 8, with a floating weight or lure, the lure body very well may fully underlie the skin and look like a much better fed crawdad. Finally, in FIGS.

9-15, inclusive, the use of a water permeable foam plastic body as a weed guard and a body filler is shown.

From the foregoing, it will be seen that this invention is well adapted to teach all of the ends and objects hereinabove and which are inherent to the apparatus.

With respect to applying the crawdad "skin" or the equivalent to the lures shown in FIGS. 1 through 8, the attachments have been described and shown. These drawings of these lures do not intend to exhaustively characterize and set forth every possible and/or existing fishing lure, particularly casting lures. Casting lures, of course, are divided into floating and sinking. The specific examples of mounting the "skin" shown indicate that the crawdad "skin" in one size or another, can be attached to any lure that is large enough or has an engaging surface or body part that can accommodate, receive or permit it to be bound thereto.

With respect to the lure shown in FIGS. 1-4 and the crayfish "skin" of FIG. 5 with respect thereto, the subject skin can be mounted on that particular lure by applying of fixing the plastic body of water absorbent foam to or over the weight. Then the "skin" may be applied to the foam body. Yet alternatively, the tail of the "skin" can be slit and glued directly on the weight of this particular lure in place of or in addition to the wire mounting thereon.

It must be understood that the specific lures shown and described in this Patent Application are not any part of the invention. It is the application thereto of the crayfish or other organism skin in the manner shown and described with or without the employment of a body of water absorbent plastic foam.

Where there may be a problem in mounting the subject inventive skin with respect to a lure weight or any part thereof, to give direct access of the "skin" to the weight or any part of the lure, the tail of the "skin" can be split and glued on the weight or other lure part. Almost universally speaking, the weight is mounted on and fixed to the hook shaft prior to the crawdad or other organism skin. When the plastic body or plastic foam body is employed, it can be glued on the weight and then the skin split as required or needed to be glued to the plastic body and any other part of the lure which is desired.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A floating fish lure for casting and retrieval on the surface of a body of water to catch fish, comprising a three-dimensional body streamlined from a blunter front end to a finer back end, there being one or more hooks connected to spaced apart portions of the said lower body, the improvement which comprises draping a substantially two-dimensional organism skin simulacrum over the upper portion of the lure body away from the hooks and fastening at least the central body portion of said skin to said lure body, whereby to permit integral parts and appendages that naturally, for a live organism, move in the water for the given simulacrum of the live organism to so move, and the front end of the lure further including a platform bearing a line eyelet, the tail portion of said skin overlying said platform.

2. In a casting, submerging fishing lure having an elongate hook wire with a barb at one end and a line receiving eyelet adjacent the other end, therebeing a weight on said wire fixed thereto and spaced away from said hook end, there also being a weed guard associated with the lure, said weed guard comprising a frusto-conical bundle of fibers projecting from their mounting on the weight toward the hook barb end of the lure, the improvement which comprises:

a flexible, substantially two-dimensional simulacrum having simulated body parts of a fish attracting organism mounted three-dimensionally over said weed guard and at least a portion of said simulacrum fixed to at least one of said weed guard and a portion of said weight, the positioning of said simulacrum allowing simulated body parts of the simulacrum to simulate the movement of naturally movable body parts of the fish attracting organism, while holding at least a three-dimensional body simulating portion of the simulacrum essentially stable with respect to said weed guard and weight.

3. A device as in claim 2 wherein the simulacrum is of a crayfish including a body portion, feelers, arms, claws, legs and rear, segmented body portions.

4. In a fisherman-useable casting and retrieving fish lure for use in attracting and capturing a fish in a body of water, the fish lure having a hook wire, a hook barb at one end thereof and a line receiving loop adjacent the other end thereof, as well as a weight fixed to said hook wire spaced away from said hook, the improvement which comprises:

an elongate body of water permeable foam plastic fixed at one end to the weight and extending toward the hook barb, there being a two-dimensional simulacrum skin of a three-dimensional fish attracting organism having a central body portion three-dimensionally mounted over the weight and the elongate body of plastic, as well as the hook barb, so as to simulate with the two-dimensional simulacrum the three-dimensional fish attracting organism, the said two-dimensional simulacrum skin being positionally fixed in its central body portion to at least one of the body of plastic foam and the weight, the said two-dimensional simulacrum skin further having simulated body parts of the fish attracting organism, the simulacrum body parts further including the central body portion and simulated movable body parts, said simulated movable body parts simulating the movement of naturally movable body parts of the fish attracting organism as the fisherman causes the lure to move through the water by retrieving the lure.

5. A device as in claim 4 wherein the weight is outside most of the plastic body.

6. A device as in claim 4 wherein the weight is largely inside the plastic body.

7. A device as in claim 4 wherein the animal simulacrum is a crawdad with free and movable feelers, arms, claws, legs and rear segmented body portions.

8. In a fisherman-useable casting and retrieving fish lure for use in attracting and capturing a fish in a body of water, the fish lure having a hook wire, a barbed hook at one end thereof and a line receiving loop adjacent the other end thereof, there being a weight fixed to said hook wire spaced away from said hook, the improvement which comprises:
a body of foam plastic material permeable to water fixed to the weight and extending away therefrom toward the hook barb,
a fish attracting organism simulacrum having a simulated head portion and a simulated body portion, the head portion of the simulacrum wrapped over and around the sides of the plastic body and fixed thereto,
the body portion of the simulacrum being elongate, movable, wavy and curly, said simulacrum body extending backwardly from the simulacrum head portion over the barbed portion of the hook when the lure is being retrieved by the fisherman.

9. In a fisherman-useable casting, floating fishing lure for use in attracting and capturing a fish in a body of water, the fish lure having a floatable body for floating the lure on a body of water, a hook receiving loop at a front end of the floatable body and a line receiving eyelet at the rear end of the floatable body, and at least one hook receivingly retained on the hook receiving loop, the improvement which comprises:
a flexible, substantially two-dimensional simulacrum of a three-dimensional fish attracting organism having a central body portion three-dimensionally mounted over the floatable body, so as to simulate with the two-dimensional simulacrum the three-dimensional fish attracting organism,
the said two-dimensional simulacrum being positionally fixed in its central body portion to the floatable body,
the said two-dimensional simulacrum further having simulated body parts of the fish attracting organism, the simulacrum body parts further including the central body portion and simulated movable body parts, said simulated movable body parts simulating the movement of naturally movable body parts of the fish attracting organism as the fisherman causes the lure to move through the water by retrieving the lure.

10. The lure as set forth in claim 9 wherein said simulacrum simulates a crayfish.

11. The lure as set forth in claim 10 wherein said simulated free body parts of said simulacrum further includes simulated legs, feelers and claws.

12. In a fisherman-useable casting and retrieving fish lure for use in attracting and capturing a fish in a body of water, the fish lure having a hook wire, a hook barb at one end thereof and a line receiving loop adjacent the other end thereof, as well as a weight fixed to said hook wire spaced away from said hook, the improvement which comprises:
an elongate body of water permeable foam plastic fixed at one end to the weight and extending angularly away from said hook wire and toward the hook barb, said elongate body having a beveled end portion adjacent said hook barb for providing clearance between said elongate body and said hook barb
there being a two-dimensional simulacrum skin of a three-dimensional fish attracting organism having a central body portion three-dimensionally mounted over the weight and the body of plastic, as well as the hook barb, so as to simulate with the two-dimensional simulacrum the three-dimensional fish attracting organism,
the said two-dimensional simulacrum skin being positionally fixed in its central body portion to at least one of the body of plastic foam and the weight,
the said two-dimensional simulacrum skin further having simulated body parts of the fish attracting organism, the simulacrum body parts further including the central body portion and simulated movable body parts, said simulated movable body parts simulating the movement of naturally movable body parts of the fish attracting organism as the fisherman causes the lure to move through the water by retrieving the lure.

13. The lure as set forth in claim 12 wherein said simulacrum simulates a crayfish.

14. The lure as set forth in claim 13 wherein said simulated free body parts of said simulacrum further includes simulated legs, feelers and claws.

15. In a fisherman-useable casting and retrieving fish lure for use in attracting and capturing a fish in a body of water, the fish lure having a hook wire, a hook barb at one end thereof and a line receiving loop adjacent the other end thereof, as well as a weight fixed to said hook wire spaced away from said hook, the improvement which comprises:
an elongate body of water permeable foam plastic fixed at one end to the weight and extending angularly away from said hook wire and toward the hook barb, said elongate body having an end portion adjacent said hook barb for providing clearance between said elongate body and said hook barb
there being a two-dimensional simulacrum skin of a three-dimensional fish attracting organism having a head portion three-dimensionally mounted over at least one of the weight and the body of plastic, as well as the hook barb, so as to simulate with the two-dimensional simulacrum the three-dimensional fish attracting organism,
the said two-dimensional simulacrum skin being positionally fixed in its head portion to at least one of the body of plastic foam and the weight,
the said two-dimensional simulacrum skin further having an elongate movable, wavy and curly body portion for simulating the elongate body parts of the fish attracting organism, the body portion of the simulacrum further simulating the movement of the body part of the fish attracting organism as the fisherman causes the lure to move through the water by retrieving the lure.

* * * * *